United States Patent
Sosa et al.

(10) Patent No.: US 11,693,135 B1
(45) Date of Patent: Jul. 4, 2023

(54) TUNABLE NEUTRON IMAGING SCINTILLATOR

(71) Applicant: RADIATION MONITORING DEVICES, INC., Watertown, MA (US)

(72) Inventors: Charles Sosa, Watertown, MA (US); Vivek Nagarkar, Weston, MA (US)

(73) Assignee: RadiationMonitoring Devices, Inc, Watertown, MA (US)

( * ) Notice: Subject to any disclaimer, the term of this patent is extended or adjusted under 35 U.S.C. 154(b) by 293 days.

(21) Appl. No.: 17/033,738

(22) Filed: Sep. 26, 2020

Related U.S. Application Data

(60) Provisional application No. 62/907,192, filed on Sep. 27, 2019.

(51) Int. Cl.
  G01T 3/06 (2006.01)
  C09K 11/06 (2006.01)
  C09K 11/08 (2006.01)

(52) U.S. Cl.
  CPC ............... *G01T 3/06* (2013.01); *C09K 11/06* (2013.01); *C09K 11/08* (2013.01); *C09K 2211/1007* (2013.01); *C09K 2211/1011* (2013.01)

(58) Field of Classification Search
  None
  See application file for complete search history.

(56) References Cited

U.S. PATENT DOCUMENTS

| | | | |
|---|---|---|---|
| 6,921,909 B2 | 7/2005 | Nagarkar | |
| 7,372,041 B1 * | 5/2008 | Nagarkar | G01T 3/06 |
| | | | 250/390.11 |
| 9,090,967 B1 | 7/2015 | Nagarkar | |
| 9,296,945 B2 | 3/2016 | Van Loef | |
| 10,266,759 B1 | 4/2019 | Shah | |
| 10,266,761 B2 | 4/2019 | Zaitseva | |
| 10,429,517 B1 * | 10/2019 | Isham | G01T 1/2002 |
| 2015/0346362 A1 | 12/2015 | Kondrasovs | |
| 2016/0186052 A1 | 6/2016 | Zaitseva | |

OTHER PUBLICATIONS

Shestakova et al. "A new scintillator structure for thermal neutron imaging" Nuclear Instruments and Methods in Physics Research Section B: Beam Interactions with Materials and Atoms vol. 263, Issue 1, Oct. 2007, pp. 234-238 (Year: 2007).*

Zaitseva et al. "Neutron detection with single crystal organic scintillators" Proc. of SPIE vol. 7449 744911-1 (2009). (Year: 2009).*

Lopez-Lascano et al., "Deposition of ZnO and Gd2O3 by co-sputtering to enable ZnO—Gd2O3 based PIN junction diodes", Materials Science in Semiconductor Processing 111 (2020) 105005 (Year: 2020).*

(Continued)

*Primary Examiner* — Edwin C Gunberg

(74) *Attorney, Agent, or Firm* — Culhane Meadows PLLC; Orlando Lopez

(57) ABSTRACT

A scintillator-based imaging screen technology that is sensitive to neutral and charged particles is disclosed. These teachings improve the temporal and spatial resolution limitations of the screens currently used in static and dynamic neutron detection and imaging, neutron tomography, and other advanced neutron imaging equipment used to study materials, such as neutron reflectometers and diffractometers.

28 Claims, 14 Drawing Sheets

(56) References Cited

OTHER PUBLICATIONS

Edgar V. Van Loef et al., Novel Organic Scintillators for Neutron Detection, 2010 IEEE Nuclear Science Symposuim & Medical Imaging Conference, Oct. 30-Nov. 6, 2010.

Shestakova et al., A new sensor for thermal neutron imaging, IEEE Transactions on Nuclear Science, vol. 52, No. 4, Aug. 2005, pp. 1109-1113.

S. D. Clarke et al., Development of a Multi-Signature Composite Detector Based on CLYC and Plastic Scintillator, 2018 IEEE Nuclear Science Symposium.

* cited by examiner

TUNABLE NEUTRON IMAGING SCINTILLATOR

CROSS-REFERENCE TO RELATED APPLICATIONS

This application claims priority of U.S. Provisional Application Ser. 62/907,192, filed Sep. 27, 2019, entitled: TUNABLE NEUTRON IMAGING SCINTILLATOR, which is incorporated herein by reference in its entirety for all purposes whatsoever.

BACKGROUND

These teachings relate generally to a scintillator that is sensitive responds promptly to neutral and charged particles, can be tuned to achieve high detection efficiency for fast or slow neutrons, can be tuned to emit a predetermined color light for improved spectral-response matching with a light sensor, and can discriminate between neutron and gamma interactions based on pulse shape discrimination (PSD) or pulse height discrimination (PHD).

Traditional neutron-imaging screens (e.g., LiF/ZnS, LiNaI, or Gd2O2S:Tb) are sensitive to both photoelectric absorption and Compton scattering from gamma rays, and this sensitivity can create unwanted image distortion and noise. Also, traditional neutron-imaging screens consist of inorganic scintillator materials that are slow (>200 ns) to respond to radiation interactions, which limits the image acquisition rate and extends the total measurement time. Inorganic scintillators used in traditional neutron-imaging screens are largely insensitive to neutrons and thus are mixed or coupled to a converter material. The converter material (e.g., lithium, boron, cadmium, or gadolinium) can capture slow-moving (i.e., ultra-cold, cold, or thermal) neutrons and release charged particles that the scintillator can detect. Thus, traditional neutron-imaging screen technology has been predominantly limited to applications that rely on the detection of slow-moving neutrons. Even greater challenges are presented in fast-neutron imaging where the speed of the neutron makes it effectively transparent to both the inorganic scintillator and converter layer. Fast neutrons have a greater chance of interacting with low atomic number (Z) materials, such as plastic or organic scintillators, and some work has been done to assess the capability of these scintillators in fast-neutron imaging. Research has shown that a plastic scintillator screen can be used to image objects with fast neutrons with a poor signal-to-noise ratio (SNR) and spatial resolution due to low light yield and optical-photon scattering, respectively. Moreover, the majority of CCD or CMOS light sensors are most sensitive to green wavelengths, rather than the blue emission of most plastic scintillators. This mismatch in light-detection efficiency negatively impacts the SNR. Other work has shown that small pillars of plastic scintillators can be stacked together to form a pixelated screen that provides an increase in spatial resolution as compared to a non-pixelated plastic scintillator screen. By pixelating the plastic scintillator, the neutron interaction location is better preserved by allowing a fraction of the scintillation light from the pixel to funnel directly to only a few adjacent pixels on the CMOS or CCD imaging sensor. However, the resolution of a pixelated plastic scintillator screen is limited by the relatively low refractive index of plastic scintillators and the pixel dimensions that are realistically producible without adding to the assembly complexity.

Given the current limitations in traditional neutron-imaging screen technology, a need exists for a screen that can provide the following criteria: (1) a high light yield, (2) a rapid response, (3) an emission spectrum well-matched to the chosen light sensor, (4) excellent spatial resolution, (5) gamma-ray interaction suppression, (6) high detection efficiency for slow and fast neutrons, and (7) large area coverage. Furthermore, most of the current scintillators used for thermal neutron detection are moisture sensitive. A scintillator that can offer all the properties mentioned above and is not sensitive to atmospheric conditions is highly desirable.

BRIEF SUMMARY

A scintillator-based imaging screen technology that is sensitive to neutral and charged particles is disclosed herein below. These teachings improve the temporal and spatial resolution limitations of the screens currently used in static and dynamic neutron imaging, neutron tomography, and other advanced neutron imaging equipment used to study materials, such as neutron reflectometers and diffractometers.

In one or more embodiments, the scintillator of these teachings includes an organic crystalline scintillator material and a neutron absorbing material. In one instance, the scintillator of these teachings has a layer of an organic crystalline scintillator material disposed on a thin layer of neutron absorbing material. In another instance, In one or more embodiments, the organic crystalline scintillator material is tuned to produce a predetermined emission distribution. In one embodiment, the method of these teachings for tuning emission distribution from a layer of organic crystalline scintillator material includes depositing the layer of organic crystalline scintillator material on a substrate at a predetermined temperature. Different peak emission and light yield correspond to different predetermined temperatures.

For a better understanding of the present teachings, together with other and further needs thereof, reference is made to the accompanying drawings and detailed description.

DETAILED DESCRIPTION

Figure 1:
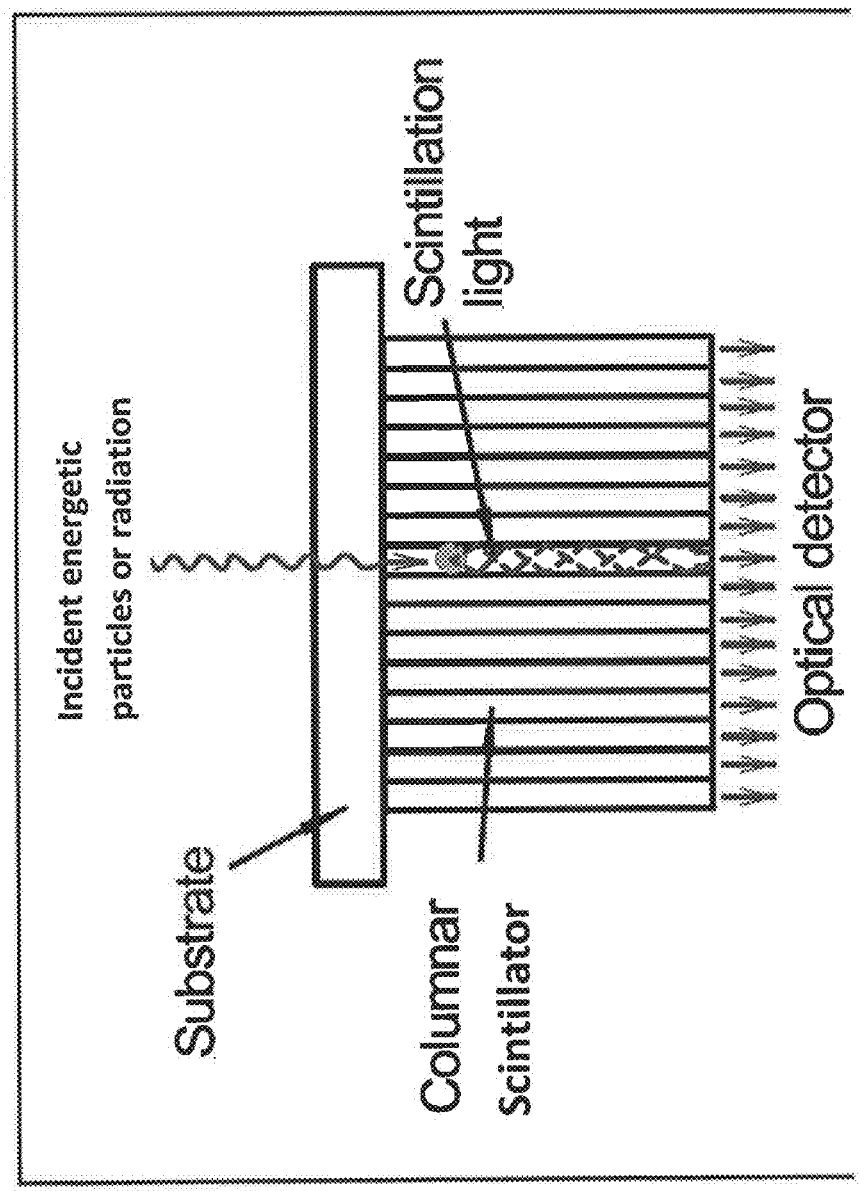
FIG. 1 shows an embodiment of a micro-columnar scintillator screen of these teachings.

The following detailed description presents the currently contemplated modes of carrying out the invention. The description is not to be taken in a limiting sense, but is made merely for the purpose of illustrating the general principles of the invention.

A "generalized cylinder," as used herein, refers to a solid bounded by a closed surface (a.k.a. cylindrical surface) and two parallel planes. A "capillary," as used herein, is a tubelike device having a small in a cross-section (such as a small diameter in a circular cross-section).

Diphenylanthracene (DPA) (chemical formula $C_{26}H_{18}$) is an organic scintillator comprised of a polycyclic aromatic hydrocarbon. DPA has been grown, in the form of single crystals, for use in scintillators for neutron detection. (See, Edgar V. van Loef, Jarek Glodo, Urmila Shirwadkar, Natalia Zaitseva, Kanai S. Shah, Novel Organic Scintillators for Neutron Detection, 2010 IEEE Nuclear Science Symposuim & Medical Imaging Conference, 30 Oct. 6 Nov. 2010, which is incorporated by reference herein in its entirety and for all purposes). Purification methods have shown that the light yield of DPA can be further increased from approximately 14 k to 20 k photons/MeV.

The prompt component of scintillation light from DPA is approximately 20 ns. DPA also exhibits pulse-shape discrimination (PSD) capability, which has been extremely useful in demonstrating scintillator performance by tagging neutron detections from an AmBe source.

The low effective Z of DPA suppresses image noise from unwanted gamma-ray interactions because of its insensitivity to photoelectric absorption. In other words, when it comes to gamma-ray interactions, DPA is strictly sensitive to Compton scatter, whereas traditional neutron-imaging screens that use inorganic scintillators are sensitive to both photoelectric absorption and Compton scattering.

The crystalline organic material of the present teachings (e.g. DPA), can be vapor deposited to form a thin film. Film thickness and properties can be tailored by varying the deposition techniques and/or by deposition parameters including the chamber pressure, the substrate temperature, the orientation of the substrate relative to the source, the rate of deposition, etc.

In one embodiment, deposition process also allows incorporation of 'foreign ions' to be included in the composition, e.g. $^6$Li, $^{10}$B, $^{157}$, $^{155}$Gd etc. The films of these compounds can be deposited on top of DPA films and the process repeated to form a multi-layer structure, or the materials can be incorporated in the film through the process of co-evaporation.

The scintillation spectrum is ideally situated between the wavelengths of peak sensitivity for most light sensors (blue and green). The emission spectrum ranges from 410 nm (blue) to 550 nm (green) and peaks at approximately 470 nm (teal). The present teachings show that a heat-treatment method can tune the peak emission of DPA to optimize the spectral match between the scintillator and light sensor.

Micro-columnar scintillators, for materials such as CsI (Tl), have been grown, by vapor deposition, as shown in FIG. 1. Furthermore, a microcolumnar layer may be pixellated, for example, so as to further improve spatial resolution. In some embodiments, the scintillator layer includes a pixelated micro-columnar film scintillator. (see, for example, Shestakova et al., IEEE Trans. Nucl. Sci., Vol. 52, No. 4, August (2005), U.S. Pat. Nos. 6,921,909, and 9,090, 967, all of which are incorporated herein by reference in their entirety and for all purposes.)

The structure of DPA is naturally crystalline. With the methodology described above, DPA can be shaped into nano/micro-sized hexagonal pillars. Densely packed hexagonal DPA pillars can be deposited onto a given substrate. DPA pillars offer a significant advantage in spatial resolution over a screen made of a single bulk DPA crystal. Similar in concept to micro-columnar cesium-iodide (CsI), a pillared-structure of DPA can help preserve the interaction location by channeling scintillation light through the pillar to the light sensor. The relatively high refractive index (n>1.7) of DPA to other organic (and even inorganic) materials suggests that scintillation light produced within a pillar of DPA can be efficiently transported to the coupled light sensor.

In one or more embodiments, the detector screen of these teachings includes an organic scintillator comprised of a polycyclic aromatic hydrocarbon molecule (C26H18) called diphenylanthracene (DPA) and a layer of neutron absorbing material, such as enriched lithium-6 fluoride ($^6$LiF). The neutron absorbing material ($^6$LiF in one embodiment) provides sensitivity for thermal neutron detection.

Figure 2:
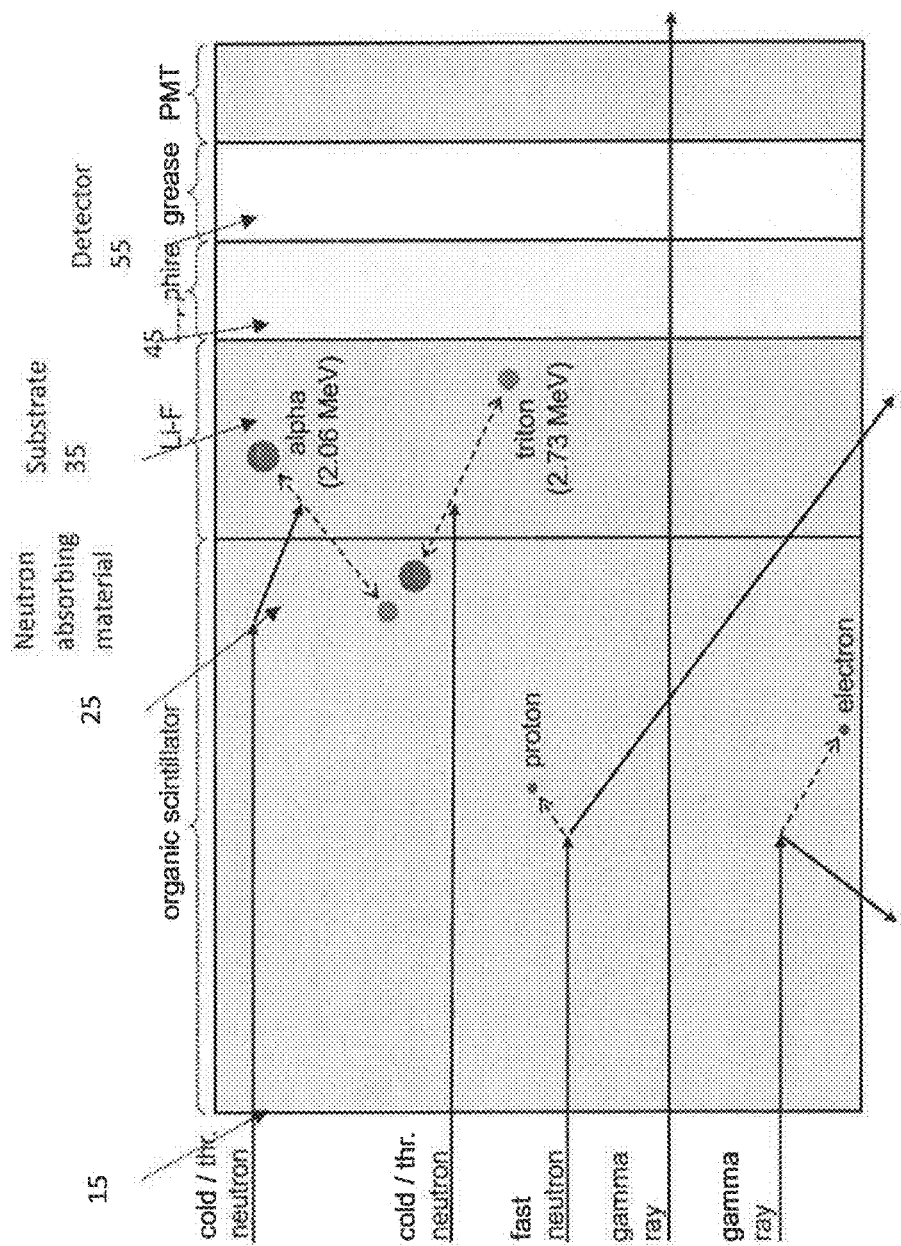
FIG. 2 shows another embodiment of the scintillator screen of these teachings.

One embodiment of the detector screen of these teachings is shown in FIG. 2. Referring to FIG. 2, in the embodiment shown therein, an organic scintillator 15, such as DPA, is disposed on a thin layer of neutron absorbing material 25, $^6$Li enriched LiF in the embodiment shown there in. The organic scintillator/neutron absorbing material is disposed on a substrate 35, a sapphire substrate in the embodiment shown. A layer of grease 45 helps in coupling the substrate to an optical detector, such as a light sensor or a photomultiplier tube (PMT), a PMT in the embodiment shown. Typicality, the DPA organic scintillator 15 is a micro-columnar structure, as shown in FIG. 1. Although the neutron absorbing material 25 is shown as $^6$Li enriched LiF, other neutron absorbing materials, such as $^{10}$B compounds ($^{10}$B enriched borosilicate glass for example) or $^{157}$Gd or $^{155}$Gd compounds, are within the scope of these teachings.

Since DPA is partly comprised of hydrogen, fast neutrons can interact with DPA through elastic scatter on the hydrogen nucleus, thus releasing an energetic proton that directly ionizes the DPA to produce scintillation. The present teachings can include, in one embodiment, a stand-alone micro-columnar DPA screen deposited onto a transparent substrate for a fast-neutron imaging application. Alternatively, the screen can be modified for ultra-cold, cold, or thermal neutron-imaging applications by adding a thin layer of enriched Lithium-6-Fluoride ($^6$LiF) between the DPA and the transparent substrate. An alpha and triton particle are released from the nucleus of $^6$Li in opposite directions to one another upon the capture of a cold/thermal neutron. Since the triton can travel further (~40 um) in $^6$LiF than the alpha (~5 um), the thickness of the $^6$LiF layer is effectively limited to 30-40 um to allow for the triton to leave with sufficient kinetic energy such that it can still ionize the DPA and produce scintillation. Consequently, the thermal neutron detection efficiency is also limited. To achieve nearly 99% cold/thermal neutron detection efficiency, a $^6$LiF layer of approximately 150-200 micrometers would be required. By stacking layers of DPA and $^6$LiF on top of each other, a high detection efficiency can be achieved.

Figure 3:
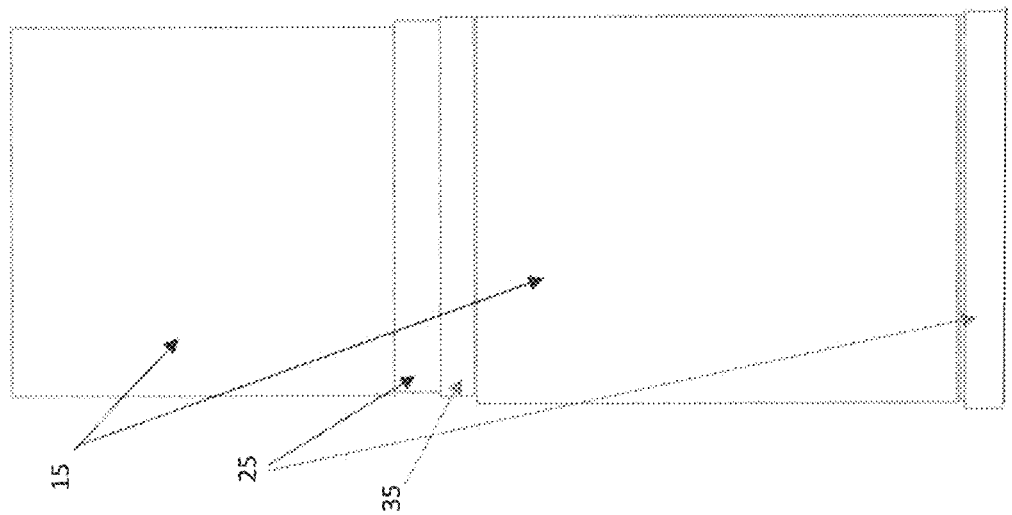
FIG. 3 shows a two layer embodiment of the scintillator screen of these teachings.

FIG. 3 shows an embodiment of the scintillator screen of these teachings in which a second set of DPA and $^6$LiF layers is placed on top of a first set of DPA and $^6$LiF layers. It should be noted that these teachings are not limited only to two sets of DPA and $^6$LiF layers. Referring to FIG. 3, in the embodiment shown there in, a first set of a DPA layer 15 and a layer of neutron absorbing material 25 is deposited on a substrate 35. A second set of a layer of DPA 15 and a layer of neutron absorbing material 25 is disposed on the substrate 35. The layer of DPA 15 in the second set is vacuum deposited on the substrate 35 and the layer of neutron absorbing material 25 in the second set is disposed on the layer of DPA 15 in the second set.

Figure 4:
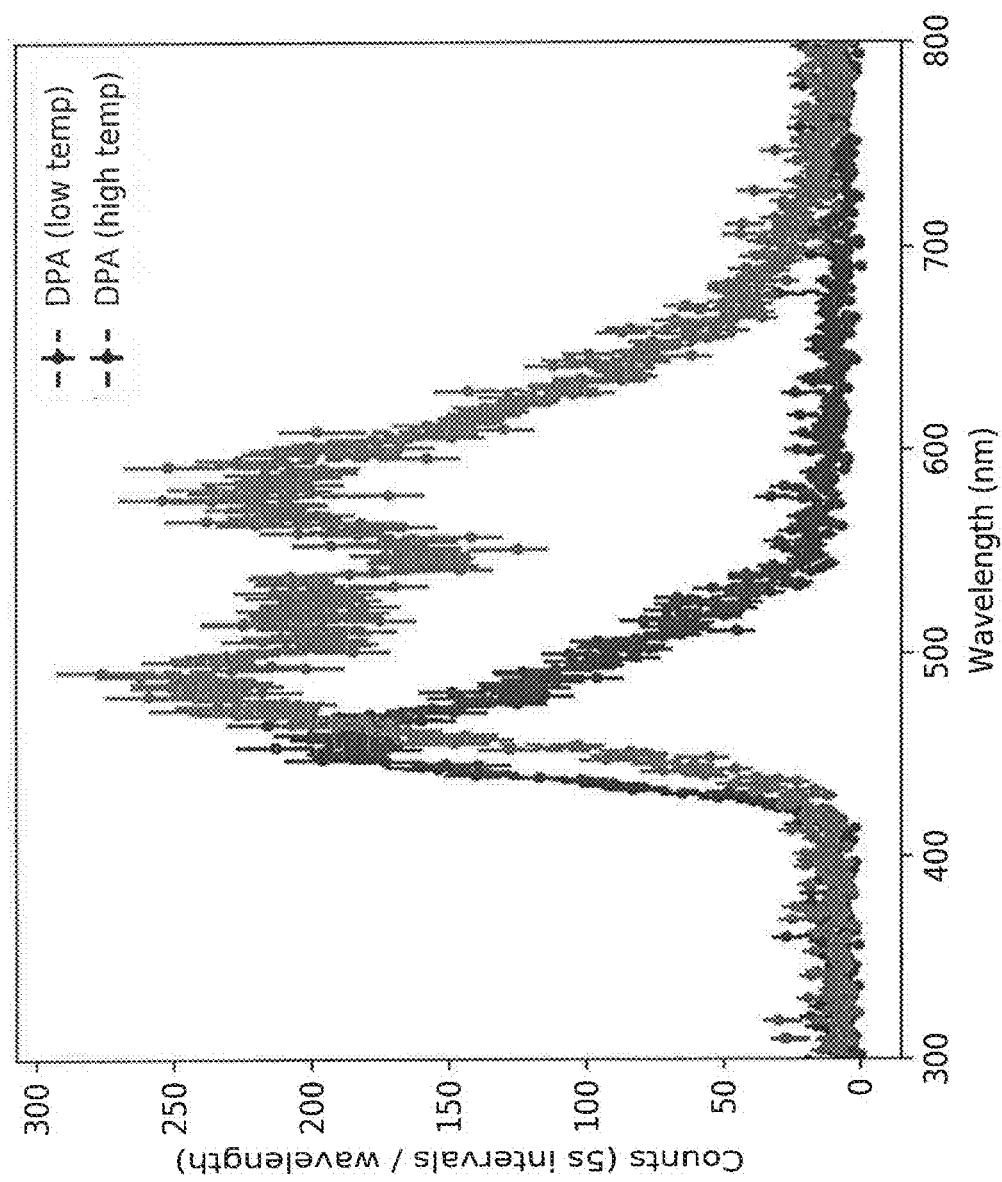
FIG. 4 shows the radioluminescence spectra of two vacuum deposited DPA discs, deposited at different temperatures.

FIG. 4 shows the radioluminescence spectra of two identically sized (300 um thickness and 2.54 cm diameter) DPA screen discs deposited onto a silicon substrate at different temperatures—a low and a high-temperature, respectively. The radioluminescence spectra for the two DPA samples were recorded using a Philips X-ray tube (Cu anode operated at 40 kV and 20 mA). Light from the sample passed through a McPherson 234 monochrometer (600 grooves/mm) and detected by a Burle C31034 PMT (operated one hour after cooling with dry ice from room temperature. The difference in the peak emission and light yield show that the emission distribution can be tuned with temperature.

Figure 5:
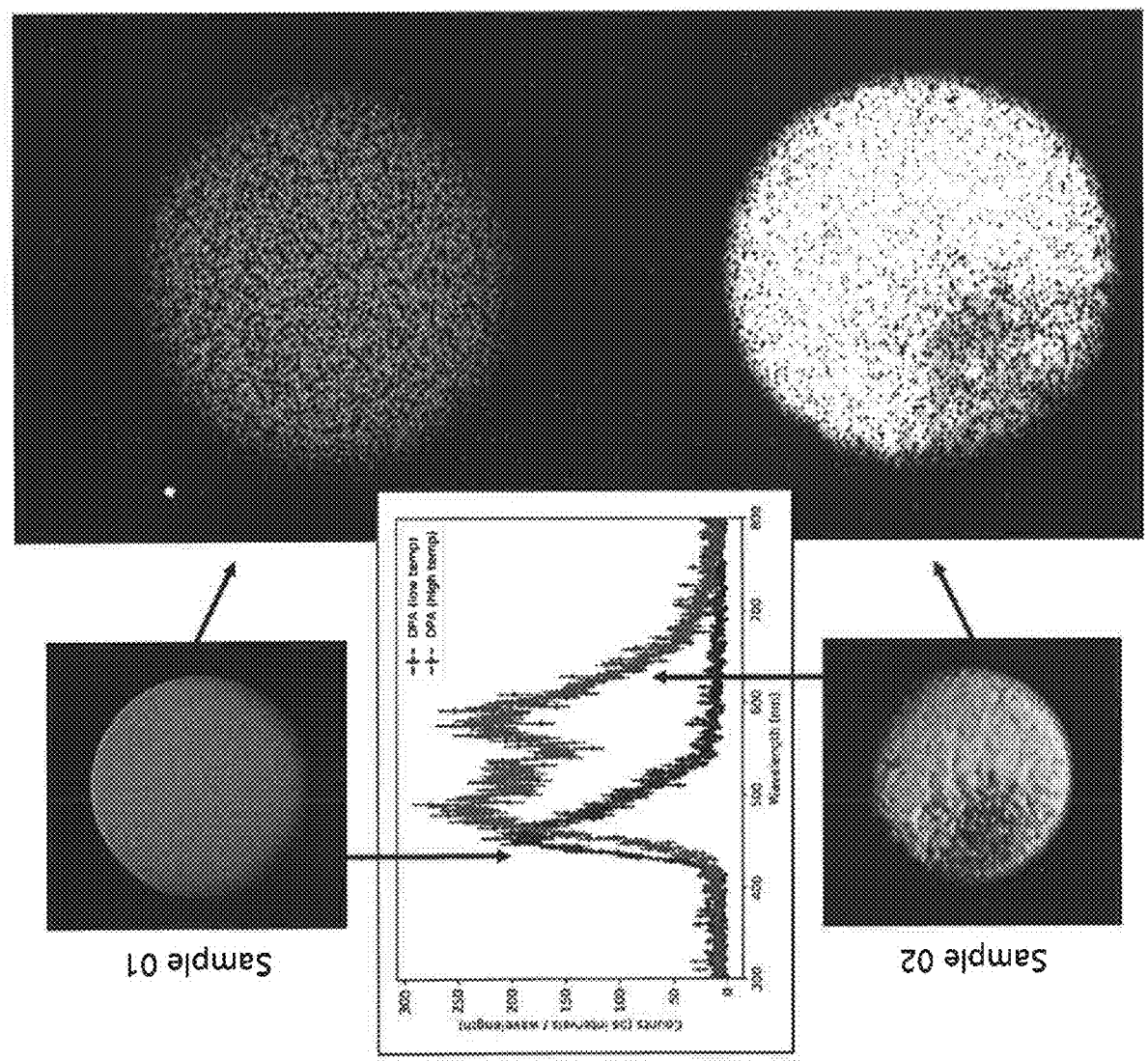
FIG. 5 shows the scintillation response of the two vacuum deposited DPA discs of FIG. 4.

Both DPA samples were placed on a Photometrics camera system that captured light during a total of five, five second X-ray exposures at 100 kV and 20 mA (25 seconds total). The peak sensitivity of the camera is in the wavelength range for green light. Each of the five images were flat-field corrected with individual dark and flood images, and later summed together to produce the image in FIG. 5. The result demonstrates that for the same acquisition time, particle energy, and light sensor, the green-emitting DPA sample produced a brighter response than the blue-emitting DPA sample.

Figure 6:
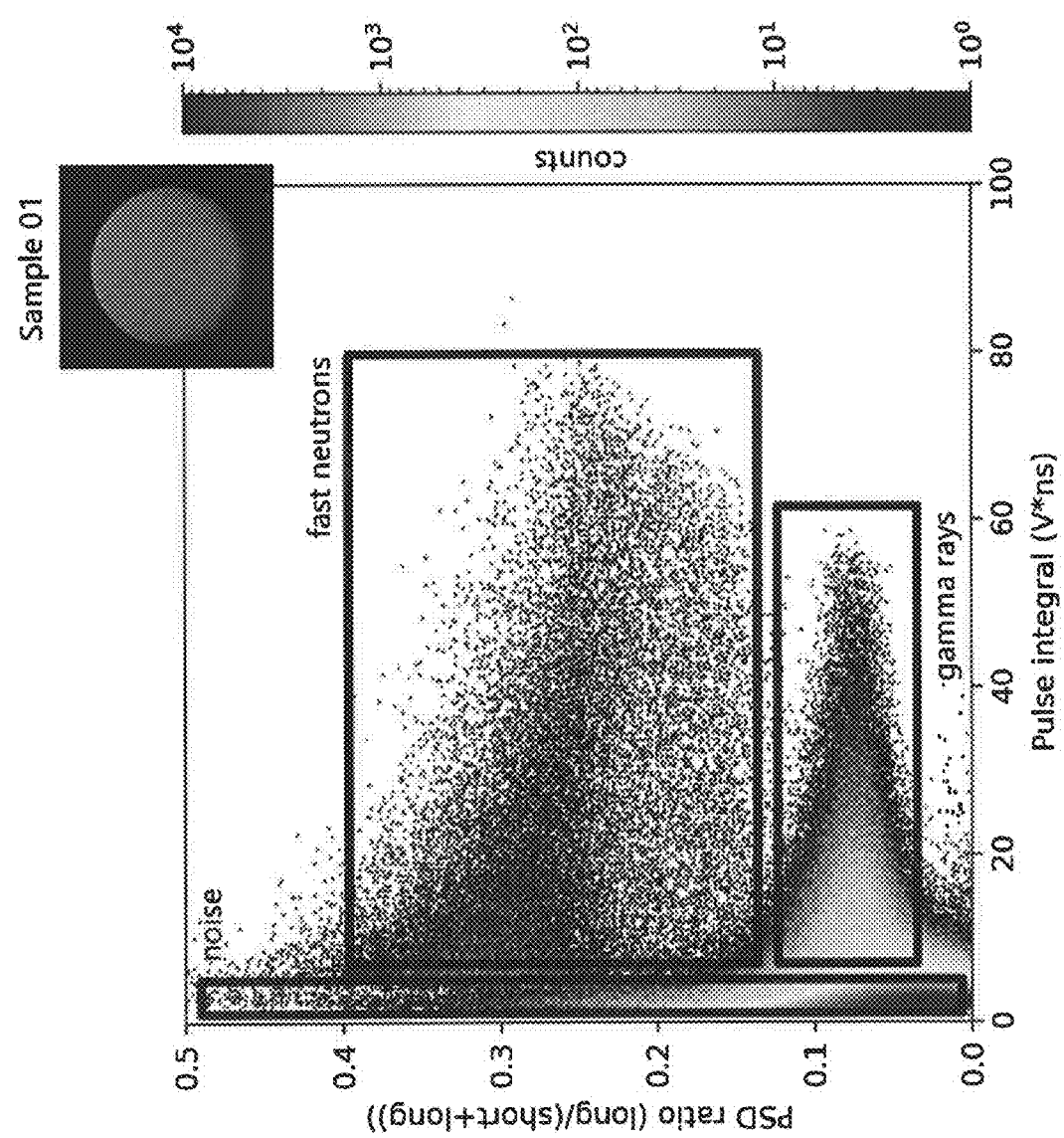
FIG. 6 shows pulse shape discrimination results for one of the two vacuum deposited DPA discs of FIG. 4.

Measurements were performed in order to demonstrate pulse shape discrimination (PSD). Pulse Shape Discrimination (PSD) is based on the difference in the shape of the neutron and gamma signals. The blue emitting DPA sample was placed on a Hamamatsu R6233-100A SBA PMT, operated at −1500V, and enclosed in a light-tight box. No optical grease was used to couple the DPA screen to the PMT window. A mixed neutron/gamma field was provided by a partially-moderated Americium-Beryllium (AmBe) source placed within 5 cm of the sample. A 12 bit CAEN DT5720 digitizer (4 ns steps, 2 V range), was used to record pulses directly from the PMT, where the data was then processed to produce the PSD shown in FIG. 6.

Figure 7:
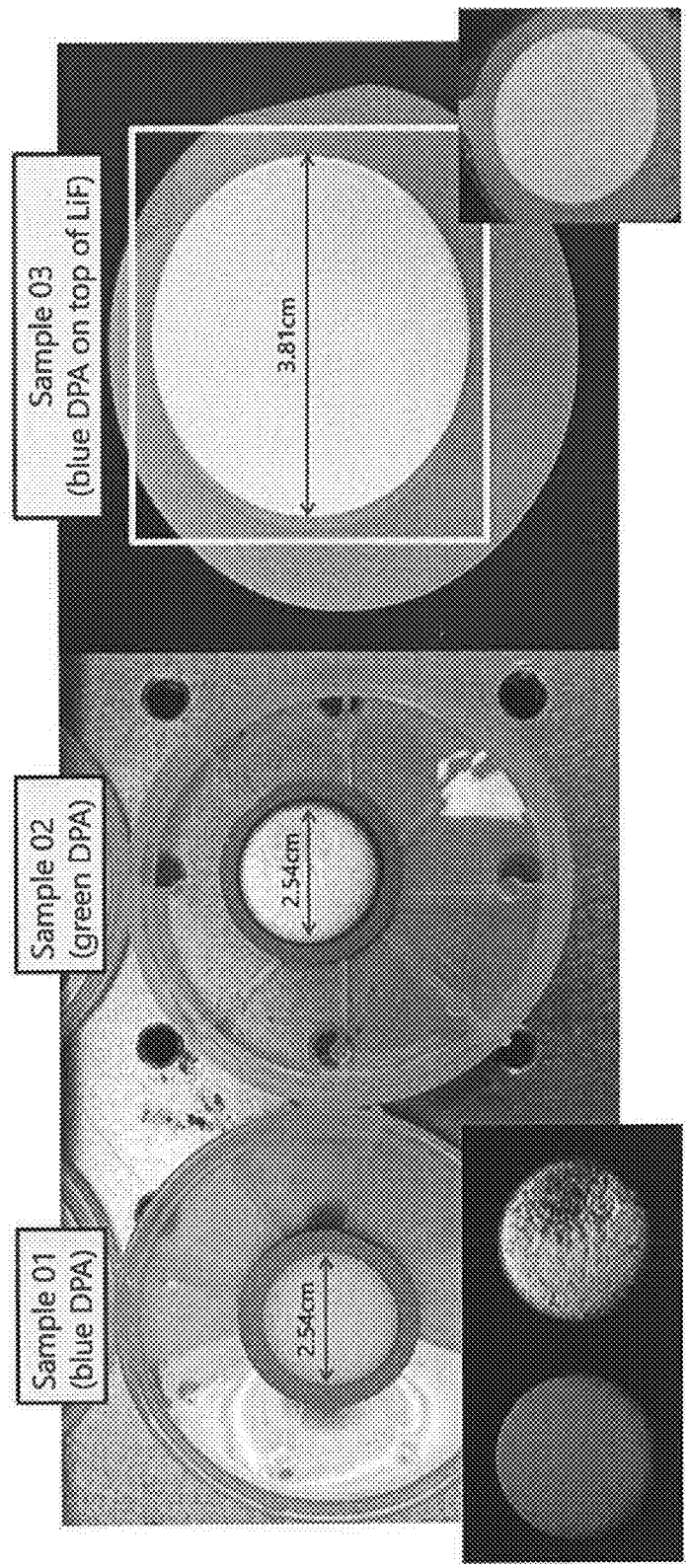
FIG. 7 shows samples of vacuum deposited DPA discs of these teachings, including one sample deposited on a thin layer of neutron absorbing material, $^6$Li enriched LiF in the embodiment shown.
Figure 8:
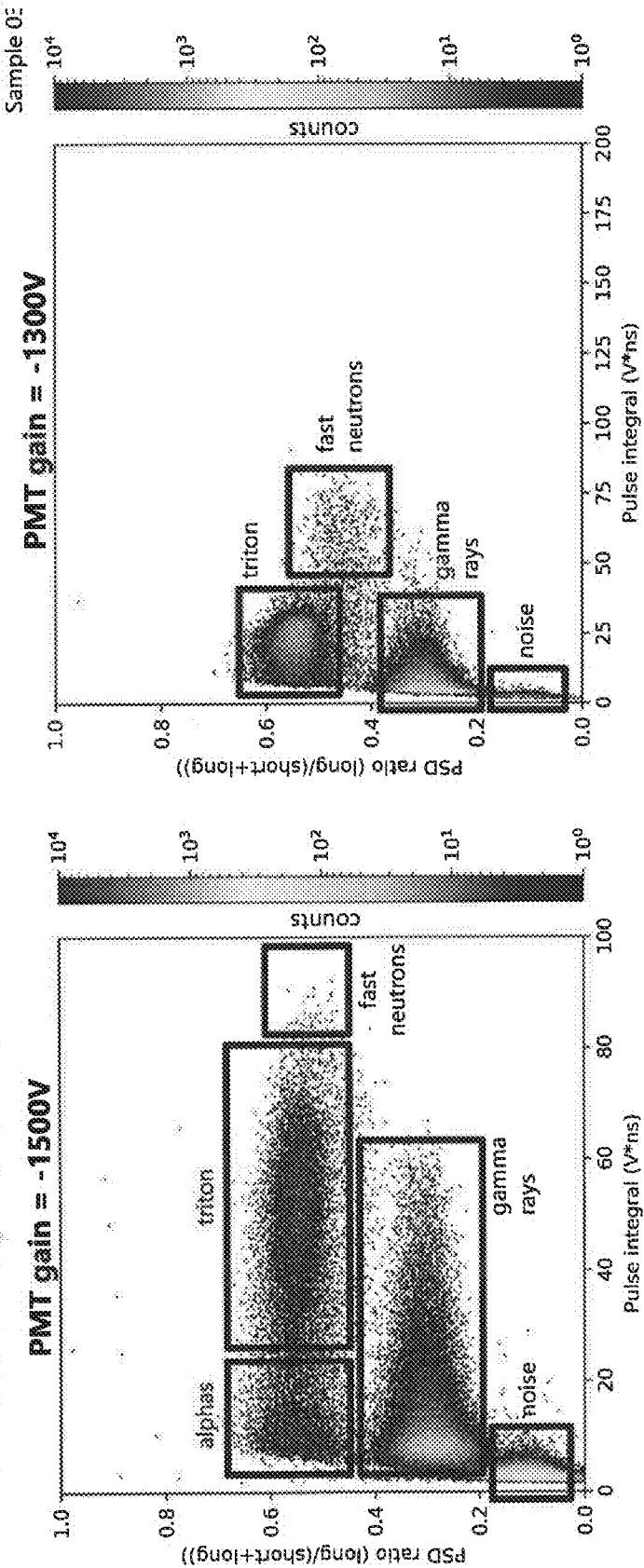
FIG. 8 shows pulse shape discrimination results at two different PMT voltages for the DPA sample deposited on a thin layer of neutron absorbing material, $^6$Li enriched LiF in the embodiment shown.
Figure 9A:
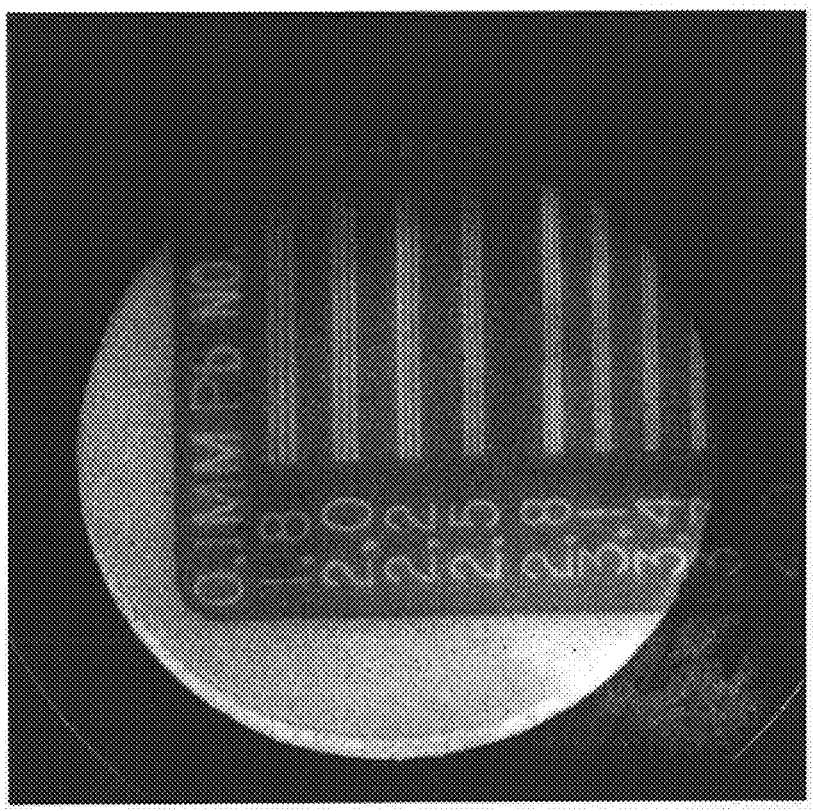
FIGS. 9a and 9b show results demonstrating the spatial resolution for the DPA sample deposited on a thin layer of neutron absorbing material, $^6$Li enriched LiF in the embodiment shown.
Figure 9B:
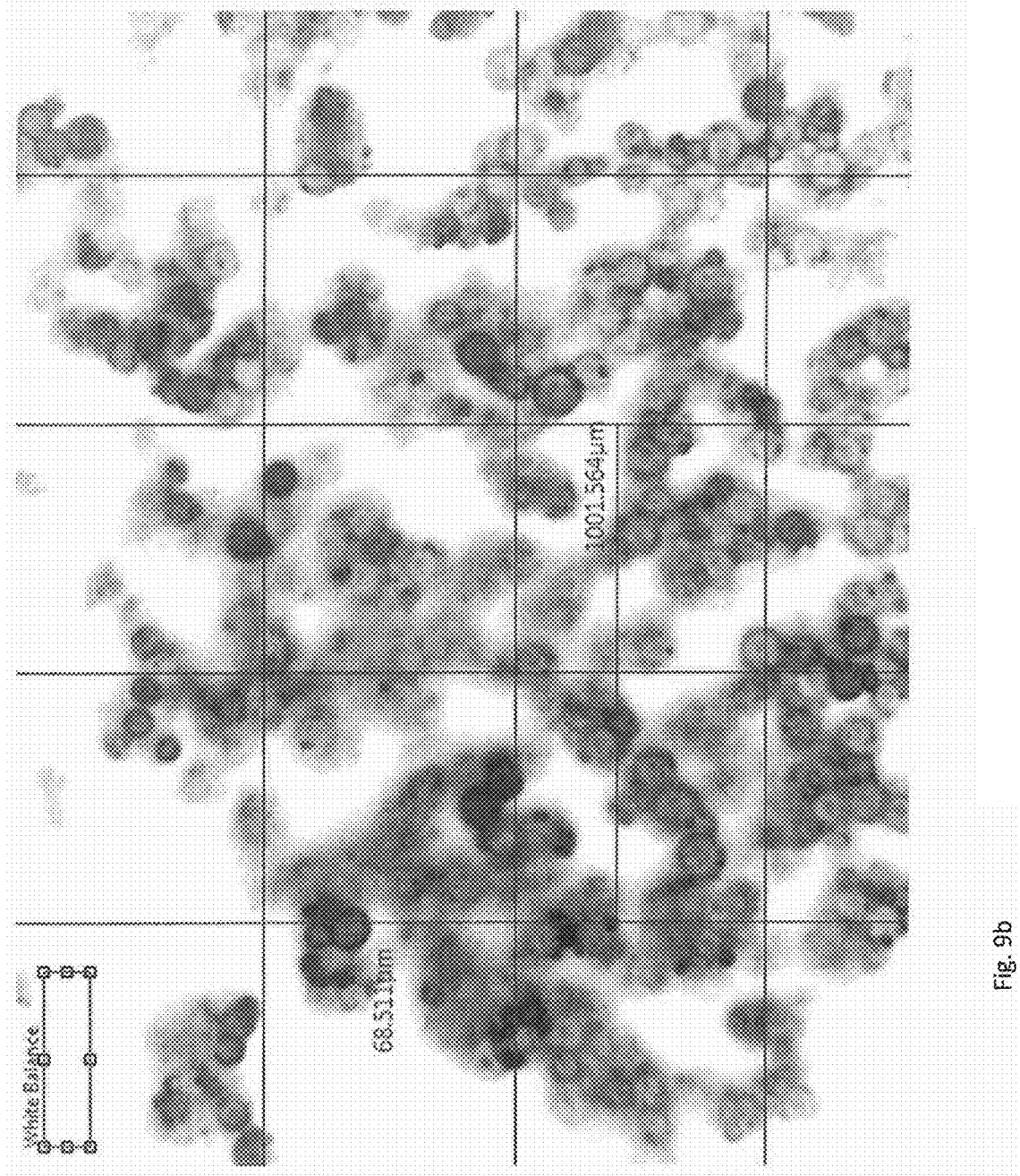

Three samples of vacuum depositing DPA as shown in FIG. 7. Pulse shape discrimination results for sample 3 are shown in FIG. 8. FIG. 9a shows results for resolution line pair phantom. FIG. 9b shows the structure of a sample scintillator.

The high index of refraction of DPA (over 1.7) is of a significant benefit as the material can be injected into capillary arrays to form a high resolution neutron scintillator. In one instance, the capillary array is a hollow generalized cylinder having one end open and the other end closed. The capillary array is made out of an optically transparent material with an index of refraction smaller than the index of refraction of the crystalline organic scintillator material. In one instance, the capillary arrays are made of borosilicate glass with index of less than 1.5 or so (see G. Tompkins, Smith, Steven & Convey, Diana, (2000). Optimizing the ellipsometric analysis of a transparent layer on glass, Surface and Interface Analysis. Vol. 29, pp. 845-850, December 2000). High index DPA incorporated into capillary arrays make a compelling case for effective channeling of scintillation light, just as fiberoptic fibers. A thick scintillator built this way will form a high resolution scintillator for fast neutron detection and imaging. The DPA material can be mixed with ions having high cross-section for thermal to cold neutrons and the resulting scintillator can be used for high resolution thermal neutron imaging.

Figure 10:
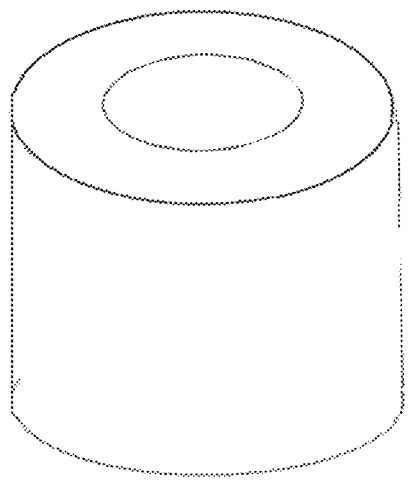
FIG. 10 shows an exterior perspective view of an embodiment of a scintillator of these teachings disposed in a hollow generalized cylinder.
Figure 10A:
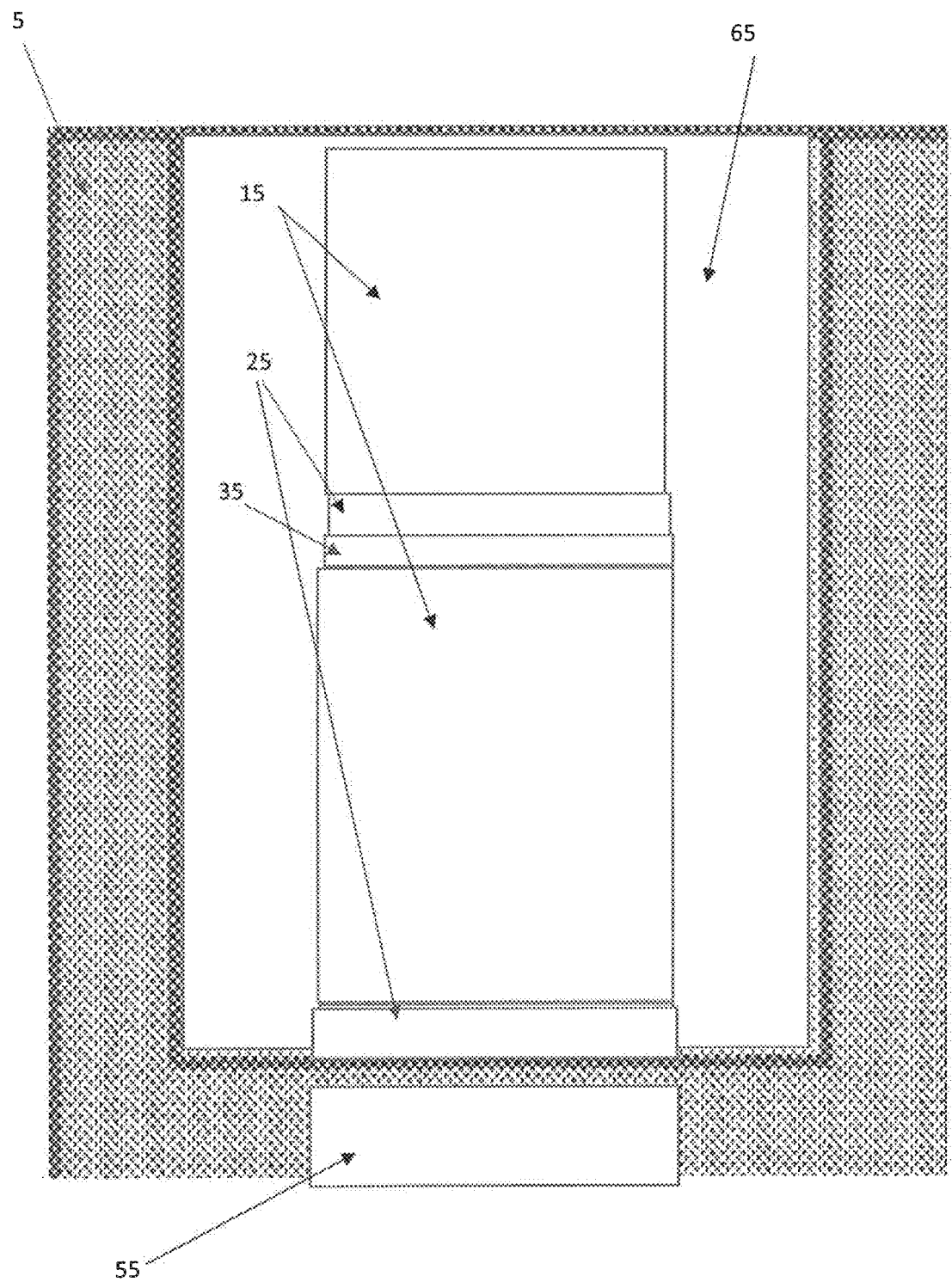
FIGS. 10A and 10B show two embodiments of scintillator screen, comprising a second set of DPA and neutron absorbing material ($^6$LiF in one embodiment) layers placed on top of a first set of DPA and neutron absorbing material ($^6$LiF in one embodiment) layers, disposed in a hollow generalized cylinder structure.
Figure 10B:
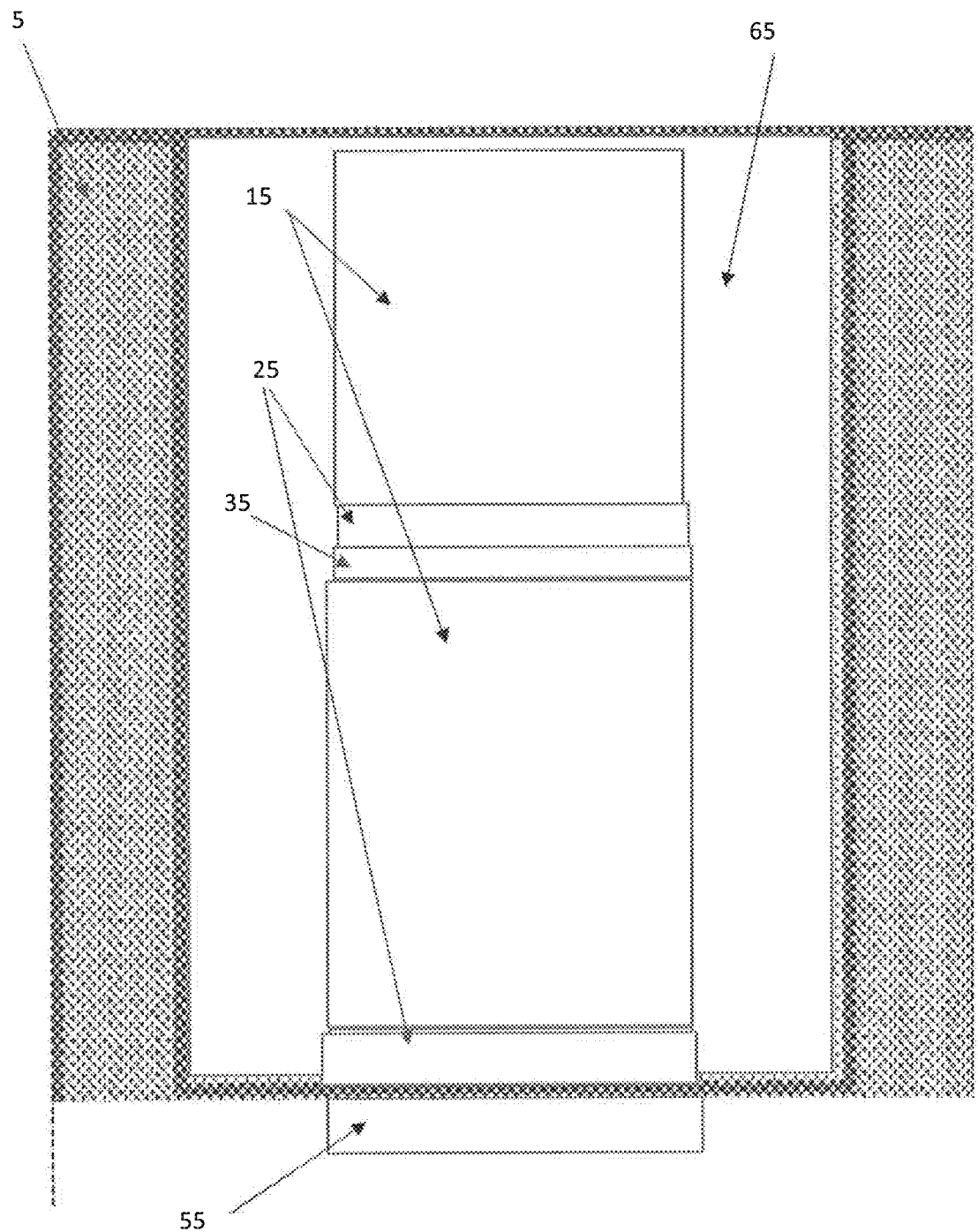
Figure 10C:
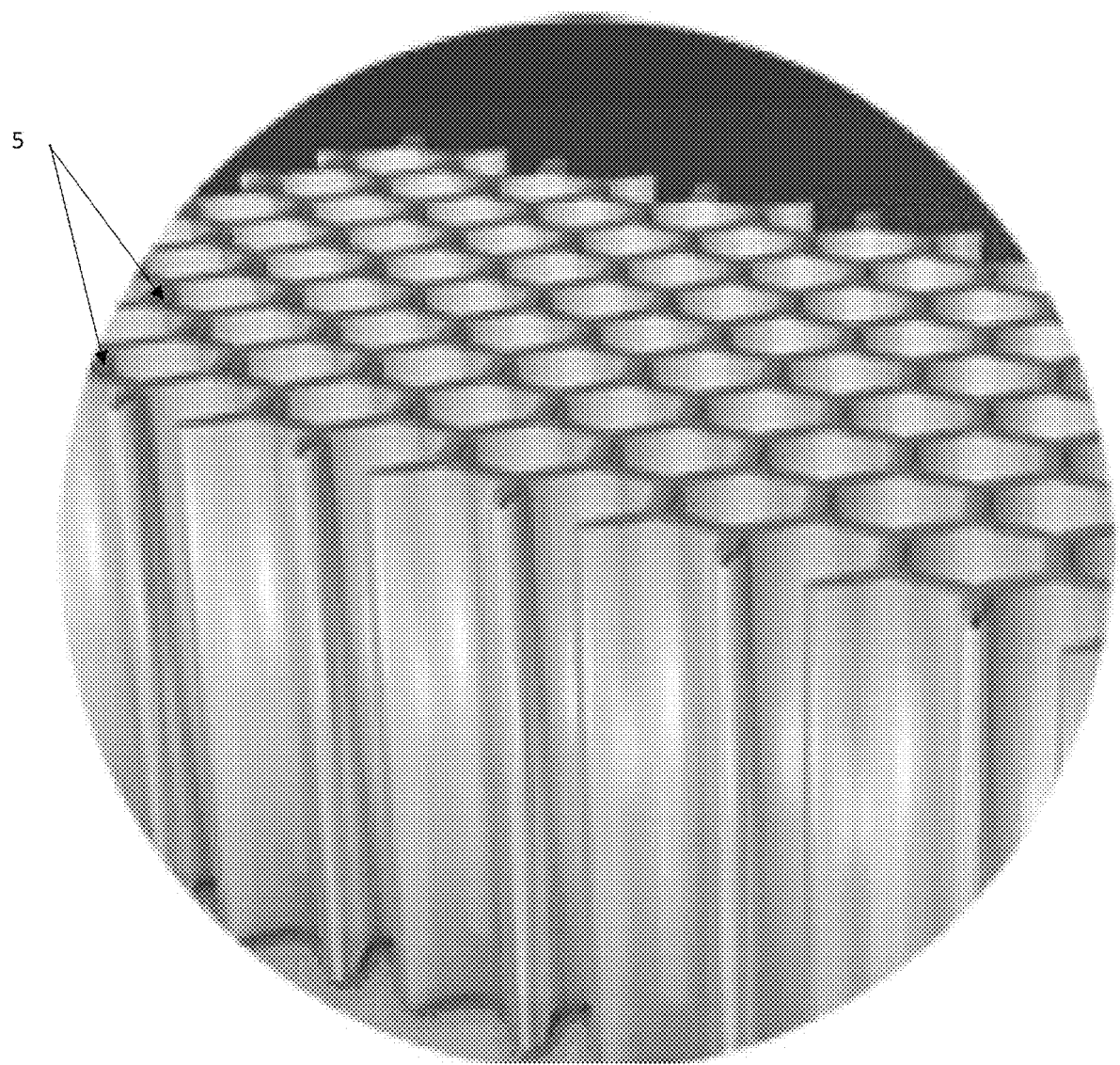
FIG. 10C shows an embodiment in which the hollow generalized cylinder is a capillary and the capillaries are assembled in an array.

An exterior perspective view of an embodiment of a scintillator of these teachings disposed in a capillary is shown in FIG. 10. FIGS. 10A and 10B show the cross-sectional view of two embodiments of the scintillator of these teachings disposed in a generalized cylinder (a capillary vessel in one embodiment). In the embodiment shown in FIG. 10A, a scintillator screen, including an organic crystalline scintillator material and a neutral absorbing material's is disposed in or injected into an intersection of the capillary vessel or a generalized cylinder. FIG. 10C shows an array of capillary vessels, which could be used in these teachings. In FIGS. 10A-10C, a wall of the generalized cylinder (a capillary in the embodiment shown in FIG. 10C) defines the inside volume of the generalized cylinder.

Borosilicate glass can be made of enriched $^{10}$B to increase the rate of thermal neutron capture probability. Alternatively, an atomic layer deposition of $^{10}$B enriched layer can be used to achieve the same.

Referring to FIG. 10A, in the embodiment shown there in, a scintillator screen, comprising a second set of DPA 15 and neutron absorbing material 25 ($^6$LiF in one embodiment) layers is placed on top of a first set of DPA 15 and neutron absorbing material 25 ($^6$LiF in one embodiment) layers, is disposed in a capillary structure 5. In the embodiment shown in FIG. 10A, the capillary structure (generalized cylinder structure) has a bottom surface on which the scintillator screen rests. In one instance, the capillary structure is formed from a substantially optically transparent material, such as borosilicate glass. The borosilicate glass can be made of enriched $^{10}$B. A detector 55 is disposed on the other side of the bottom surface.

The space between the scintillator and the capillary structure is filled with a plastic material 65. The plastic material 65 could be fabricated as described in U.S. Pat. No. 10,266, 759, which is incorporated by reference herein in its entirety and for all purposes. The plastic material is chosen to have an index of refraction less than the index of refraction of the crystalline organic scintillator material 15. For example, the plastic material 65 can be polystyrene (PS), polyvinylchloride (PVC) and polymethylmethacrylate (PMMA), four Polyvinyltoluene (PVT) (all of which have an index of refraction less than 1.7). It should be noted that these teachings are not limited only to those examples of the plastic material 65. In other instances, the plastic material could be cured optical adhesive. It should also be noted that, although the figures show a pair of a layer of crystalline organic scintillator material 15 of a thin layer of neutron absorbing material 25, embodiments having only one layer of crystalline organic scintillator material 15 over a thin layer of neutron absorbing material 25 are also within the scope of these teachings.

Referring to FIG. 10B, in the embodiment shown there in, the capillary structure 5 is structured such that the detector 55 is disposed below the layer of neutron absorbing material 25 in the second set of layers.

The material of the capillary structure and the plastic material 65 and dimensions are selected such that scintillation light is channeled by total internal reflection.

In any of the capillaries shown in FIG. 10C, the organic crystalline scintillator material (or in one instance, the organic crystalline scintillator material and the neutron absorbing material) is injected into the inside volume of the capillary. In one instance, the scintillator material has the crystalline organic scintillator material with the neutron absorbing material incorporated in (for example by co-deposition). In another instance, the organic crystalline scintillator material is injected into one end (the open end) of the capillary and a layer of the neutron absorbing material is disposed on the other end of the capillary.

For the purposes of describing and defining the present teachings, it is noted that the term "substantially" is utilized herein to represent the inherent degree of uncertainty that may be attributed to any quantitative comparison, value, measurement, or other representation. In respect to optical operations, such as transparency, the inherent degree of uncertainty is the degree of uncertainty known to one skilled in the art. The term "substantially" is also utilized herein to represent the degree by which a quantitative representation may vary from a stated reference without resulting in a change in the basic function of the subject matter at issue.

It should be noted that these teachings are not limited only to those two embodiments, and that many different embodiments of the scintillator screen of these teachings can be disposed in a capillary structure. Although these teachings have been described with respect to various embodiments, it should be realized these teachings are also capable of a wide variety of further and other embodiments within the spirit and scope of these teachings.

What is claimed is:

1. A scintillator comprising an organic crystalline scintillator material and a neutron absorbing material; wherein the organic crystalline scintillator material and the neutron absorbing material are vapor deposited; the organic crystalline scintillator material being deposited above a substrate at a predetermined temperature; the predetermined temperature selected such that a predetermined peak emission and a predetermined light yield are obtained.

2. The scintillator of claim 1 wherein the organic crystalline scintillator material is Diphenylanthracene (DPA) ($C_{26}H_{18}$).

3. The scintillator of claim 2 wherein the neutron absorbing material is one of $^6$Li, $^{10}$B, $^{157}$Gd or $^{155}$Gd.

4. The scintillator of claim 1 comprising a layer of an organic crystalline scintillator material disposed on a thin layer of neutron absorbing material.

5. The scintillator of claim 4 wherein the organic crystalline scintillator material is Diphenylanthracene (DPA) ($C_{26}H_{18}$).

6. The scintillator of claim 5 wherein the predetermined temperature is selected such that to a predetermined emission distribution is obtained.

7. The scintillator of claim 4 wherein in the layer of organic crystalline scintillator material is a micro-columnar structure.

8. The scintillator of claim 4 further comprising:
a second thin layer of neutron absorbing material disposed on the layer of the organic crystalline scintillator material; and
a second layer of the organic crystalline scintillator material disposed on the second thin layer of neutron absorbing material.

9. The scintillator of claim 8 wherein the organic crystalline scintillator material is Diphenylanthracene (DPA) ($C_{26}H_{18}$).

10. The scintillator of claim 8 wherein the neutron absorbing material is one of $^6$Li, $^{10}$B, $^{157}$Gd, or $^{155}$Gd.

11. The scintillator of claim 8 wherein the predetermined temperature is selected such that a predetermined emission distribution is obtained.

12. The scintillator of claim 1 wherein the neutron absorbing material is incorporated in the organic crystalline scintillator material.

13. The scintillator of claim 1 further comprising:
a hollow generalized cylinder having one end opened;
the organic crystalline scintillator material being disposed or injected in an inside volume of the hollow generalized cylinder;
the hollow generalized cylinder being comprised of an optically substantially transparent material; the optically substantially transparent material having an index of refraction smaller than an index of refraction of the organic crystalline scintillator material.

14. The scintillator of claim 13 wherein another end of the hollow generalized cylinder is closed by a surface.

15. The scintillator of claim 14 wherein a space is disposed between the organic crystalline scintillator material and an inner surface of the hollow generalized cylinder; and wherein a plastic material fills said space; the plastic material having an index of refraction smaller than the index of refraction of the organic crystalline scintillator material.

16. The scintillator of claim 14 were in a layer of the organic crystalline scintillator material is disposed on a thin layer of the neutron absorbing material.

17. The scintillator of claim 13 wherein the organic crystalline scintillator material and the neutron absorbing material are injected into the inside volume of the hollow generalized cylinder.

18. The scintillator of claim 13 wherein a layer of the neutron absorbing material is disposed at another end of the hollow generalized cylinder.

19. The scintillator of claim 18 further comprising:
a second thin layer of neutron absorbing material disposed on the layer of the organic crystalline scintillator material; and
a second layer of the organic crystalline scintillator material disposed on the second thin layer of neutron absorbing material.

20. The scintillator of claim 13 wherein the optically substantially transparent material comprises borosilicate.

21. The scintillator of claim 20 wherein the borosilicate comprises $^{10}$B.

22. The scintillator of claim 13 wherein a layer of $^{10}$B is disposed on one of an inner or outer surface of the hollow generalized cylinder.

23. The scintillator of claim 1 wherein a layer of the organic crystalline scintillator material is disposed on a thin layer of the neutron absorbing material.

24. The scintillator of claim 23 wherein in the layer of organic crystalline scintillator material is a micro-columnar structure.

25. The scintillator of claim 23 wherein the organic crystalline scintillator material is Diphenylanthracene (DPA) ($C_{26}H_{18}$).

26. The scintillator of claim 25 wherein the neutron absorbing material is one of $^6$Li, $^{10}$B, $^{157}$Gd, or $^{155}$Gd.

27. The scintillator of claim 25 wherein the predetermined temperature is selected such that predetermined temperature is selected such that to a predetermined emission distribution is obtained.

28. A method for tuning emission distribution from a layer of Diphenylanthracene (DPA) ($C_{26}H_{18}$), tuning comprising obtaining a predetermined peak emission and a predetermined light yield; the method comprising:
   selecting predetermined temperature, where DPA is to be deposited on a substrate at the predetermined temperature, such that a predetermined peak emission and a predetermined light yield are obtained; and
   depositing the layer of Diphenylanthracene on a substrate at the predetermined temperature.

* * * * *